Sept. 20, 1927.
H. H. DUKE
1,642,846
ROAD PAVING BLOCK
Original Filed Feb. 4, 1924
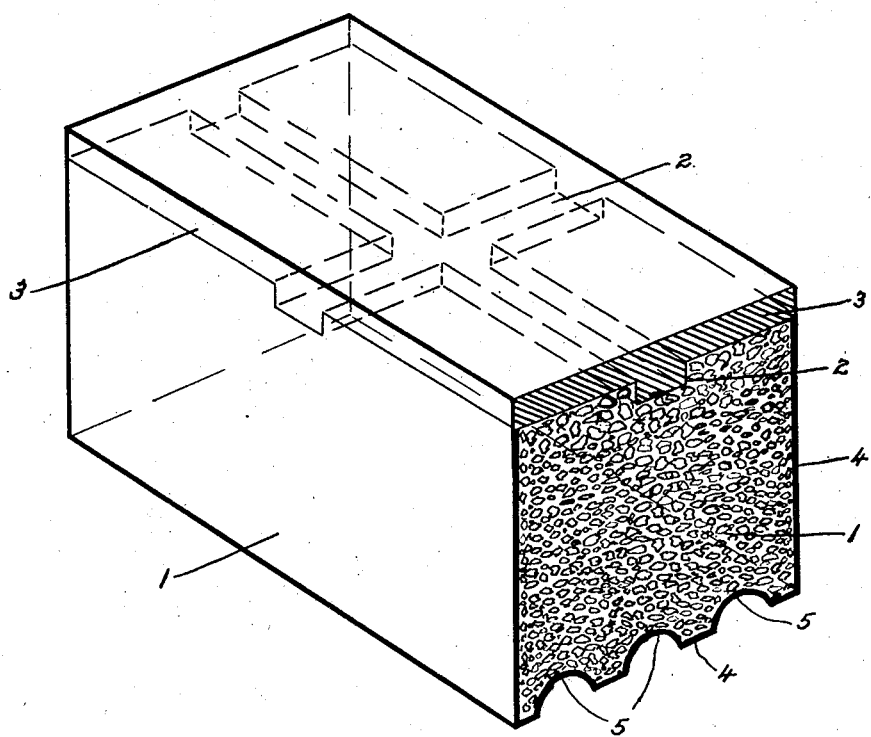

Patented Sept. 20, 1927.

1,642,846

UNITED STATES PATENT OFFICE.

HAROLD HILL DUKE, OF ROCKDALE, SYDNEY, NEW SOUTH WALES, AUSTRALIA, ASSIGNOR OF ONE-HALF TO JOSEPH HARRIS, OF BRIGHTONLE SANDS, NEW SOUTH WALES, AUSTRALIA.

ROAD-PAVING BLOCK.

Application filed February 4, 1924, Serial No. 690,670. Renewed March 28, 1927.

This invention relates to road paving blocks of the type which have hitherto been constructed either wholly or partly of rubber strengthened and toughened by the admixture of various fillers and vulcanizing ingredients.

Rubber, previous to this invention, has been generally applied to road construction in one of three ways (1) in the form of sheets and mixed with other materials (2) in the form of individual blocks, the rubber or rubber compound being affixed in various ways to foundations of concrete or similar material, or (3) in the form of solid rubber blocks similar in size to the well known wood blocks, having a wearing surface of better quality rubber than the body of the block.

This invention refers more particularly to the third type of pavement and the object of the invention is to provide an improved block which will have all the advantages of a solid rubber block, i. e. resiliency, tough surface, ability to stand up to hard wear and long life, but which will be cheaper to construct and lighter in weight.

In the accompanying drawing there is illustrated diagrammatically a block constructed according to the preferred form of the invention.

The invention consists in forming the body 1 of the block of a mixture of cork and rubber, the cork being ground to about the size of a pea and being combined with sufficient rubber together with well known vulcanizing ingredients in well known proportions so that when it is vulcanized under pressure a compact and tough block is formed. The proportions of cork and rubber are approximately three parts cork to one of rubber.

The upper surface is formed with grooves or channels 2 to receive a wearing layer 3 about ½ inch to ¾ inch thick of high grade "tread" rubber which is vulcanized and keyed to block by the grooves or channels 2. The other sides of the block are faced with a thin layer 4 of rubber so as to render the whole block impervious to moisture.

The block may be strengthened by the addition of some flexible re-inforcement such as canvas or wire-netting or similar reinforcement.

The underside of the block may be fluted as at 5 so that when it is laid on the concrete base any water which may percolate through may get away.

It is obvious that the blocks may be moulded in any desired shape in accordance with the particular purpose for which it is intended.

The blocks are laid in the usual manner and adjoining sides which may be grooved, are coated with pitch or the like so that the road way will be a continuous and homogeneous mass.

For a cheaper block sawdust may be substituted for the cork ingredient.

I claim:—

A paving block which comprises a mixture of approximately three parts of granular cork, one part of rubber, and vulcanizing ingredients, vulcanized together under pressure into a compact and tough mass, keyways in the tread surface of the block, a relatively thick layer of rubber vulcanized to the tread surface of the block, and a relatively thin layer of rubber vulcanized to each of the other surfaces of the block.

In testimony whereof he has affixed his signature.

HAROLD HILL DUKE.